(12) United States Patent
Chadha et al.

(10) Patent No.: US 12,512,357 B2
(45) Date of Patent: Dec. 30, 2025

(54) CERAMIC ENGINEERING BY GRADING MATERIALS

(71) Applicant: Applied Materials, Inc., Santa Clara, CA (US)

(72) Inventors: Arvinder Chadha, San Jose, CA (US); Christopher Beaudry, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 345 days.

(21) Appl. No.: 18/112,988

(22) Filed: Feb. 22, 2023

(65) Prior Publication Data

US 2023/0312422 A1  Oct. 5, 2023

Related U.S. Application Data

(60) Provisional application No. 63/326,599, filed on Apr. 1, 2022.

(51) Int. Cl.
| | |
|---|---|
| *H01L 21/683* | (2006.01) |
| *C04B 35/10* | (2006.01) |
| *C04B 35/581* | (2006.01) |
| *H02N 13/00* | (2006.01) |

(52) U.S. Cl.
CPC .......... *H01L 21/6833* (2013.01); *C04B 35/10* (2013.01); *C04B 35/581* (2013.01); *H02N 13/00* (2013.01); *C04B 2235/3217* (2013.01); *C04B 2235/3225* (2013.01); *C04B 2235/3865* (2013.01); *C04B 2235/75* (2013.01)

(58) Field of Classification Search
CPC .......... C04B 35/00–83; C04B 2235/75; H01L 21/6831; H01L 21/6833; H02N 13/00
See application file for complete search history.

(56) References Cited

U.S. PATENT DOCUMENTS

| | | |
|---|---|---|
| 7,436,645 B2 | 10/2008 | Holland et al. |
| 7,544,251 B2 | 6/2009 | Holland et al. |
| 7,648,914 B2 | 1/2010 | Kropewnicki et al. |
| 7,967,930 B2 | 6/2011 | Lewington et al. |

(Continued)

FOREIGN PATENT DOCUMENTS

| | | |
|---|---|---|
| CN | 111118477 A | 5/2020 |
| JP | H09-8114 A | 1/1997 |

(Continued)

OTHER PUBLICATIONS

International Preliminary Report on Patentability for PCT/US2023/014284 dated Oct. 10, 2024, 5 pgs.

(Continued)

*Primary Examiner* — Thienvu V Tran
*Assistant Examiner* — Christopher J Clark
(74) *Attorney, Agent, or Firm* — Schwabe, Williamson & Wyatt, P.C.

(57) ABSTRACT

Embodiments disclosed herein include a puck for an electrostatic chuck. In an embodiment, the puck comprises a substrate with a top surface and a bottom surface. In an embodiment, a first material composition is at the top surface of the substrate, and a second material composition is at the bottom surface of the substrate. In an embodiment, a composition gradient is provided through the substrate between the top surface and the bottom surface.

18 Claims, 10 Drawing Sheets

(56) References Cited

U.S. PATENT DOCUMENTS

| | | |
|---|---|---|
| 8,002,946 B2 | 8/2011 | Lewington et al. |
| 8,075,729 B2 | 12/2011 | Holland et al. |
| 2007/0221132 A1 | 9/2007 | Chandran et al. |
| 2008/0241517 A1 | 10/2008 | Kenworthy et al. |
| 2016/0336210 A1 | 11/2016 | Cooke et al. |
| 2019/0194817 A1 | 6/2019 | Sun et al. |
| 2022/0270907 A1* | 8/2022 | Boyd, Jr. .............. C23C 16/308 |
| 2023/0029877 A1* | 2/2023 | Garg ...................... C04B 35/80 |
| 2024/0379316 A1* | 11/2024 | Leeser .................. C04B 37/005 |

FOREIGN PATENT DOCUMENTS

| | | | |
|---|---|---|---|
| JP | 2002356387 A | 12/2002 | |
| JP | 2005223185 A | 8/2005 | |
| JP | 2014522572 A | 9/2014 | |
| JP | 2024533155 A | 9/2024 | |
| KR | 1020247010983 A | 4/2024 | |
| WO | 2012056915 A | 5/2012 | |
| WO | 2023034760 A | 9/2023 | |

OTHER PUBLICATIONS

International Search Report and Written Opinion from PCT/US2023/014284 dated Jun. 26, 2023, 8 pgs.
Notice of Preliminary Rejection from Korean Patent Application No. 10-2024-7036082 mailed Jul. 9, 2025, 1 pg.
Official Letter from Taiwan Patent Application No. 112108003 dated Aug. 26, 2025, 12 pgs.
Notice of Reasons for Rejection from Japanese Patent Application No. 2024-557110 dated Sep. 30, 2025, 16 pgs.

\* cited by examiner

CERAMIC ENGINEERING BY GRADING MATERIALS

CROSS-REFERENCE TO RELATED APPLICATIONS

This application claims the benefit of U.S. Provisional Application No. 63/326,599, filed on Apr. 1, 2022, the entire contents of which are hereby incorporated by reference herein.

BACKGROUND

1) Field

Embodiments relate to the field of semiconductor manufacturing and, in particular, a ceramic pucks for electrostatic chucking architectures that include a graded material composition.

2) Description of Related Art

In semiconductor manufacturing processes, a chuck is used to secure the semiconductor substrate (e.g., wafer) to a flat surface for processing. In many instances the chuck is an electrostatic chuck. That is, an electrostatic force generated by the chuck is applied to the semiconductor substrate in order to attract and secure the semiconductor substrate to the chuck. Typically, the chuck includes a baseplate and a puck over the baseplate. In some instances, one or both of the baseplate and the puck may be temperature controlled. The puck may be secured to the baseplate by an adhesive or other bonding architecture (e.g., diffusion bonding or the like).

Existing chucking architectures are limited in performance. This is because the puck may need to be optimized for a given condition, and sacrifices to overall performance are needed. In dielectric etching products, thermal uniformity limitations may prevent the dielectric etching process from running at high plasma loads. In the case of conductor etching products, the puck is unable to achieve high thermal uniformity at elevated temperatures due to the interfaces between the ceramic layer of the puck, the bonding material, and a metal baseplate. In deposition products, the operating process window cannot be expanded due to clamp force reduction in AlN at elevated temperatures. In the case of deposition and etch products, the ceramics of the puck are prone to erosion from halogen plasma causing particles.

SUMMARY

Embodiments disclosed herein include a puck for an electrostatic chuck. In an embodiment, the puck comprises a substrate with a top surface and a bottom surface. In an embodiment, a first material composition is at the top surface of the substrate, and a second material composition is at the bottom surface of the substrate. In an embodiment, a composition gradient is provided through the substrate between the top surface and the bottom surface.

Embodiments disclosed herein further comprise a puck for an electrostatic chuck. In an embodiment, the puck comprises a substrate and a first material composition in the substrate. In an embodiment, a second material composition is provided in the substrate. In an embodiment, a composition gradient is provided between the first material composition and the second material composition.

Embodiments may further comprise an electrostatic chuck. In an embodiment, the electrostatic chuck comprises a base plate and a puck adhered to the base plate. In an embodiment, the puck comprises a substrate, and a first material composition in the substrate. In an embodiment, a second material composition is provided in the substrate. In an embodiment, the puck further comprises a composition gradient between the first material composition and the second material composition.

DETAILED DESCRIPTION

Systems described herein include ceramic pucks for electrostatic chucking architectures that include a graded material composition. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

As noted above, semiconductor processing tools typically employ a chuck in order to secure the substrate (e.g., a wafer) to a flat surface for processing. The chuck is often an electrostatic chuck that includes a base plate and a puck over the base plate. In the case of an electrostatic chuck, the puck will also include electrodes in order to provide an electrostatic charge that secures the substrate to the chuck. The puck is generally a ceramic material.

There are several design considerations to take into account when selecting the material of the puck. Chucking strength, temperature uniformity, and resistance to etching chemistries are some design considerations that may be used in the design of the puck. Unfortunately, the design considerations may result in a chuck that is optimized for one application, while sacrificing performance in other areas. This is especially true when the puck is formed from a single material, as is commonly the case in existing architectures.

Figure 1:
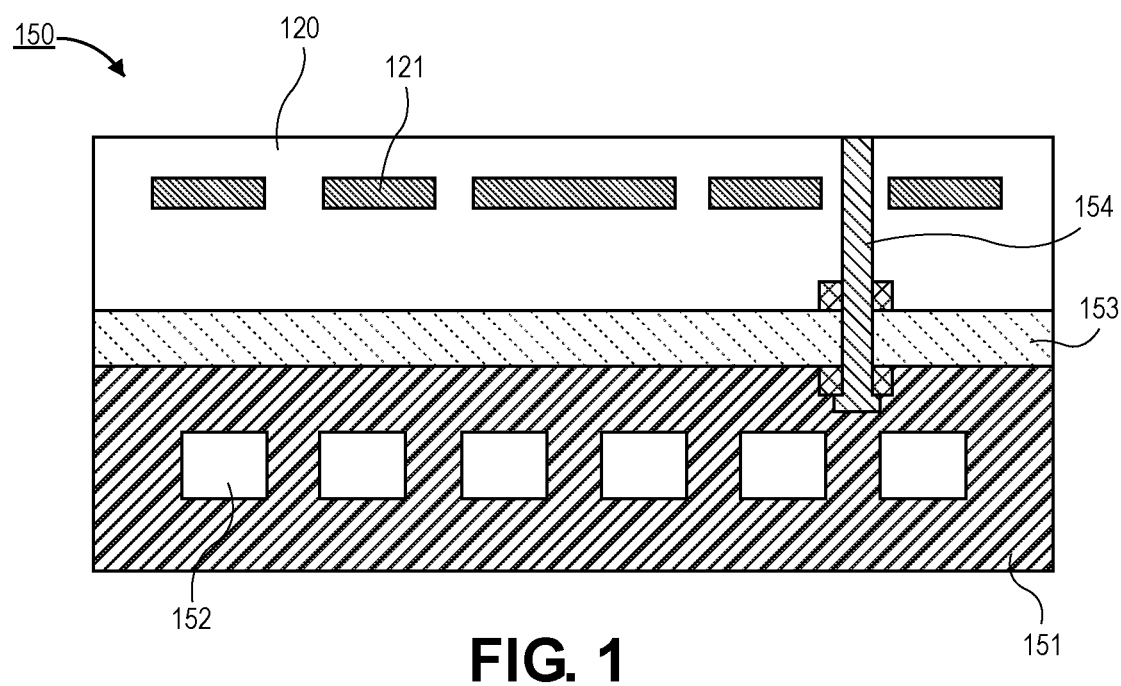
FIG. 1 is a cross-sectional illustration of an electrostatic chuck.

An example of a chuck 150 is provided in FIG. 1. As shown, a base plate 151 may be coupled to a puck 120 by an adhesive layer 153. Cooling channels 152 may be provided in the base plate 151, and an electrode 121 may be provided in the puck 120. A backside gas line 154 may supply a gas (e.g., helium) to the backside surface of the substrate (not shown) for thermal control purposes. As shown, the puck 120 comprises a single material. For example, pucks 120 may include $Al_2O_3$ or AlN in some embodiments. In other embodiments, the puck 120 may comprise a material that is more resistant to etching chemistries, such as $Y_2O_3$ or the like. Unfortunately, providing a single material limits the performance of the puck 120.

Accordingly, embodiments disclosed herein include pucks that have multiple material compositions. For example, a first surface of the puck may have a first material composition, and a second surface of the puck may have a second material composition. Additionally, there may be a compositional gradient between the first material composition and the second material composition. That is, embodiments may include a puck that has a continuously changing material composition through a thickness of the puck, or a changing material composition in a radial direction. Other compositional gradient directions may also be used in some embodiments.

The puck materials may include ceramic-ceramic gradients, ceramic-metal gradients, ceramic-polymer gradients, or metal-polymer gradients. In a particular embodiment, the ceramic materials may include metal oxides, nitrides, carbides, borides, fluorides, silicides, sulfides, or the like. In the case of metal oxides, the metal component may include aluminum, copper, molybdenum, tungsten, titanium, graphite, or the like.

Figure 2A:
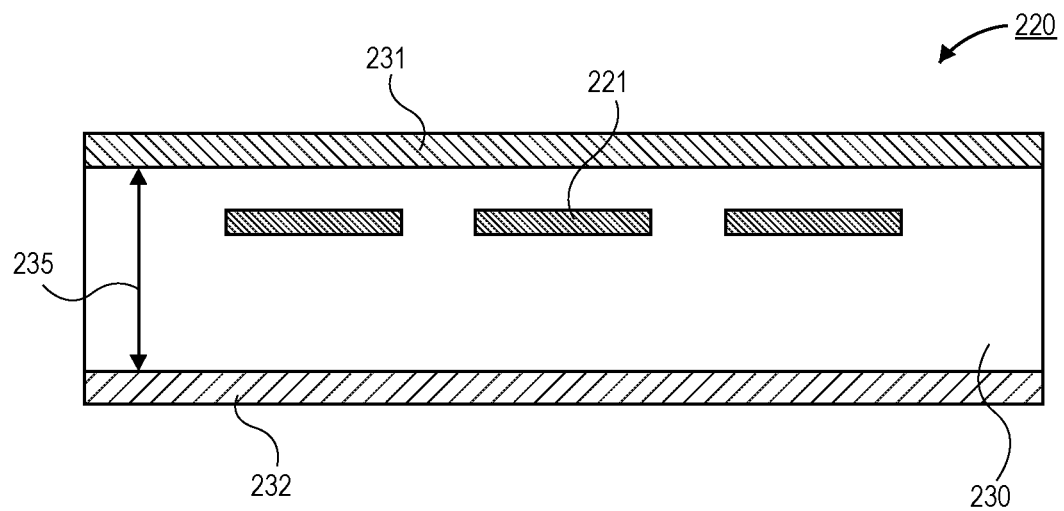
FIG. 2A is a cross-sectional illustration of a puck of an electrostatic cuck that comprises a first material composition and a second material composition with a compositional gradient between the first material composition and the second material composition, in accordance with an embodiment.

Referring now to FIG. 2A, a cross-sectional illustration of a puck 220 for an electrostatic chuck is shown, in accordance with an embodiment. In an embodiment, the puck 220 may comprise a substrate 230. Electrodes 221 may be provided in the substrate 230. The substrate 230 may have a thickness that is between approximately 0.1 mm and approximately 20 mm. The substrate 230 may include a ceramic material in some instances. Though, it is to be appreciated that other material classes (e.g., metals) may be included in the substrate 230.

In an embodiment, the substrate 230 may comprise a first material composition 231 at a top surface and a second material composition 232 at a bottom surface. Additionally, a compositional gradient 235 may be provided between the first material composition 231 and the second material composition 232. That is, a material composition of the substrate 230 may change through a thickness of the puck 220. More particularly, the embodiment shown in FIG. 2A is distinct from a situation where a first layer is on a top surface of the substrate, a second layer is on a bottom surface of the substrate, and the substrate has a single material composition through its thickness. However, it is to be appreciated that embodiments may include an architecture with a first layer on the top surface of the substrate, a second layer on a bottom surface of the substrate, and a substrate that is a single material composition. For example, the first layer may comprises 90% $Al_2O_3$ and 10% AlN, the second layer may comprise 90% AlN and 10% $Al_2O_3$, and the substrate may comprise 50% AlN and 50% $Al_2O_3$.

In an embodiment, the first material composition 231 may include a single first solid solution phase and the second material composition 232 may include a single second solid solution phase. For example, the compositional gradient 235 may start with one material and end with a second material. In one embodiment, the first solid solution phase may include 100% $Al_2O_3$ and the second solid solution phase may include 100% AlN. The compositional gradient 235 may change from an $Al_2O_3$ rich material composition at a top of the substrate 230 to an AlN rich material composition at a bottom of the substrate 230. For example, at a midpoint between the first material composition 231 and the second material composition 232, the compositional gradient 235 may have approximately 50% $Al_2O_3$ and approximately 50% AlN. Of course, it is to be appreciated that the compositional gradient 235 may not be linear. For example, the location where the compositional gradient 235 has approximately 50% $Al_2O_3$ and approximately 50% AlN may be closer to either the first material composition 231 or closer to the second material composition. In an embodiment, a percentage of one of the material compositions may be monotonically increasing through the thickness of the substrate 230.

In an additional embodiment, the first material composition 231 and the second material composition 232 may include two distinct solid solution phases. For example, the first material composition 231 may include approximately 70% $Al_2O_3$ and approximately 30% AlN. In some instances, the second material composition 232 may include approximately 100% AlN. In other embodiments, the second material composition 232 may comprise approximately 70% AlN and approximately 30% $Al_2O_3$. That is, the compositional gradient 235 is not limited to a change from a first solid solution phase to a second solid solution phase. Instead, embodiments, may include a compositional gradient 235 that transforms a first material composition with a pair of solid solution phases to a second material composition with a pair of solid solution phases.

In the case of an $Al_2O_3$ and AlN substrate 230, the $Al_2O_3$ rich top material composition 231 will provide an increase in the clamp force at higher operating temperatures. The AlN has a higher thermal conductivity, and will improve the temperature uniformity of the puck 220.

While the first material composition 231 and the second material composition 232 are described as being metal oxides and metal nitrides, it is to be appreciated that other material classes may also be used for the first material composition 231 and the second material composition 232. For example, the materials may include carbides, borides, fluorides, silicides, sulfides, or the like. Additionally, metal materials may also be used, such as aluminum, copper, molybdenum, tungsten, titanium, graphite, or the like.

Figure 2B:
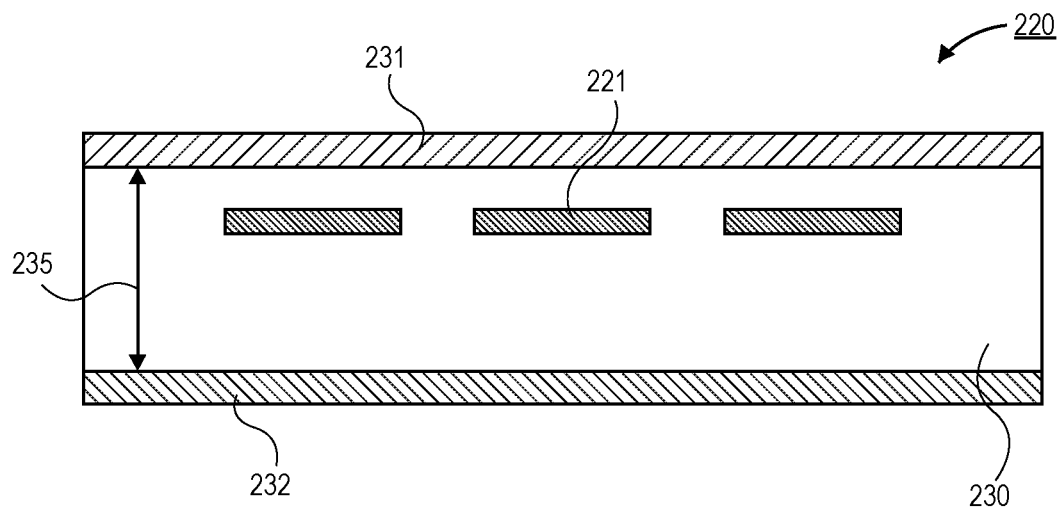
FIG. 2B is a cross-sectional illustration of a puck of an electrostatic chuck that comprises a first material composition and a second material composition with a compositional gradient between the first material composition and the second material composition, in accordance with an embodiment.

Referring now to FIG. 2B, a cross-sectional illustration of a puck 220 is shown, in accordance with an additional embodiment. As shown, the puck 220 has the opposite shading from the puck 220 in FIG. 2A. That is, the material composition that was on the bottom of the substrate 230 in FIG. 2A is now at the top of the substrate 230 in FIG. 2B. Similarly, the material composition that was on the top of the substrate 230 in FIG. 2A is now at the bottom of the substrate 230 in FIG. 2B.

For example, the first material composition 231 may comprise AlN, and the second material composition 232 may comprise $Al_2O_3$. Such an embodiment may result in improved heat conduction at higher plasma loads, and an increase in the clamp force. The clamp force may increase as a result of a decrease in the effective electrical distance. Additionally, housing the electrodes 221 in the $Al_2O_3$ controls the charge transports and improves performance of the puck 220.

In FIGS. 2A and 2B, the compositional gradient 235 is provided through a thickness of the substrate 230. However, embodiments are not limited to such configurations. For example, in FIGS. 3A and 3B different compositional gradient orientations are provided.

Figure 3A:
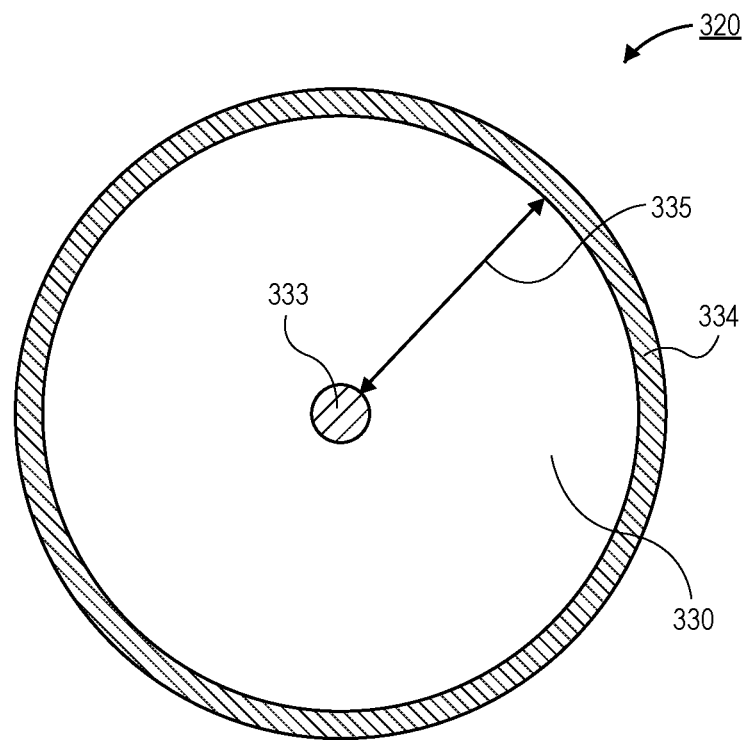
FIG. 3A is a plan view illustration of a puck with a first material composition at a center of the puck and a second material composition at an edge of the puck with a radial compositional gradient between the first material composition and the second material composition, in accordance with an embodiment.

Referring now to FIG. 3A, a plan view illustration of a puck 320 is shown, in accordance with an embodiment. In an embodiment, the puck 320 comprises a substrate 330. In an embodiment, a first material composition 333 may be provided at an approximate center of the substrate 330, and a second material composition 334 may be provided at a perimeter of the substrate 330. A compositional gradient 335 extends outwards from the first material composition 333 to the second material composition 334. That is, the compositional gradient 335 may be a radial composition gradient.

In an embodiment, the first material composition 333 and the second material composition 334 may be similar to the first material composition 231 and the second material composition 232 described in greater detail above. For example, the first material composition 333 may comprise $Al_2O_3$, and the second material composition 334 may comprise AlN. Though, it is to be appreciated that the first material composition 333 and the second material composition 334 may be reversed. Additionally, the first material composition 333 and the second material composition 334 may comprise two solid solution phases in some embodiments. In an embodiment, a solid solution phase is monotonically increasing in the radial direction. In other embodiments, a linear increase in a solid solution phase is provided along the composition gradient 335.

Figure 3B:
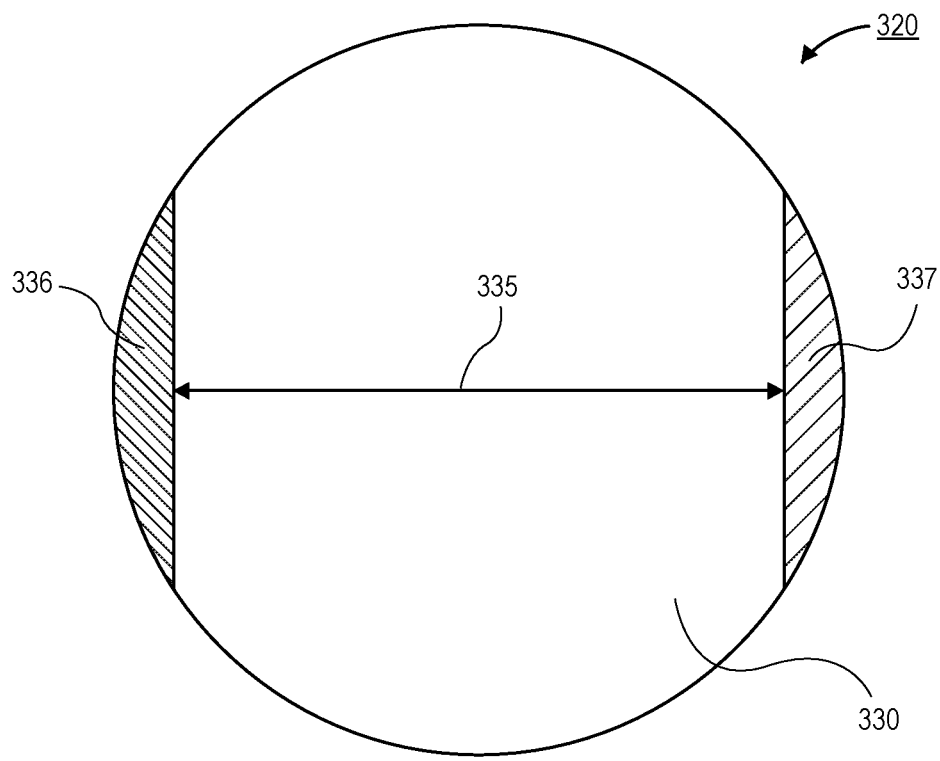
FIG. 3B is a plan view illustration of a puck with a first material composition at a first edge of the puck and a second material composition at a second edge of the puck with a compositional gradient between the first material composition and the second material composition, in accordance with an embodiment.

Referring now to FIG. 3B, a plan view illustration of a puck 320 is shown, in accordance with an additional embodiment. In an embodiment, the puck 320 comprises a substrate 330. The substrate 330 may include a first material composition 336 at a first edge of the substrate 330 and a second material composition 337 at a second edge of the substrate 330. In an embodiment, a compositional gradient 335 extends between the first material composition 336 and the second material composition 337 across the surface of the substrate 330.

In an embodiment, the first material composition 336 and the second material composition 337 may be similar to the first material composition 231 and the second material composition 232 described in greater detail above. For example, the first material composition 336 may comprise $Al_2O_3$, and the second material composition 337 may comprise AlN. Though, it is to be appreciated that the first material composition 336 and the second material composition 337 may be reversed. Additionally, the first material composition 336 and the second material composition 337 may comprise two solid solution phases in some embodiments. In an embodiment, a solid solution phase is monotonically increasing across the substrate 330. In other embodiments, a linear increase in a solid solution phase is provided along the composition gradient 335.

In the embodiments described above, a pair of material compositions are provided in the puck. However, it is to be appreciated that embodiments may include two or more different material compositions.

Figure 4A:
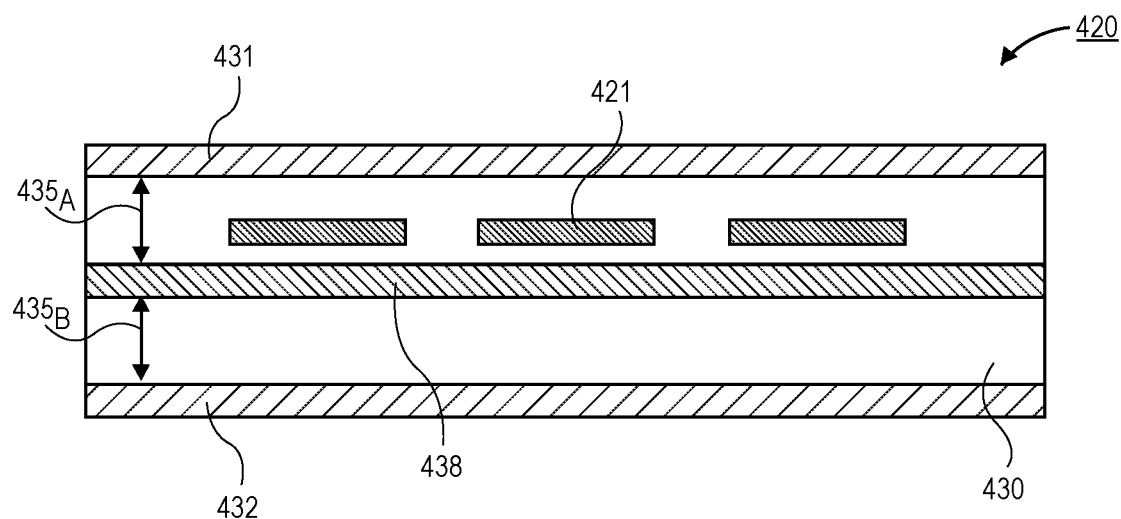
FIG. 4A is a cross-sectional illustration of a puck with a first material composition, a second material composition, and a third material composition with compositional gradients between the layers, in accordance with an embodiment.

Referring now to FIG. 4A, a cross-sectional illustration of a puck 420 is shown, in accordance with an embodiment. In an embodiment, the puck 420 comprises a substrate 430 and electrodes 421. As shown, a first material composition 431 is provided at a top surface of the substrate 430, a second material composition 432 is provided at a bottom surface of the substrate 430, and a third material composition 438 is provided between the top surface and the bottom surface of the substrate 430.

In some embodiments, the first material composition 431 and the second material composition 432 comprise the same material, and the third material composition 438 comprises a different material composition. For example, the first material composition 431 and the second material composition 432 may comprise $Al_2O_3$, and the third material composition 438 may comprise AlN. Compositional gradient 435A may be provided between the first material composition 431 and the third material composition 438, and compositional gradient 435B may be provided between the third material composition 438 and the second material composition 432.

In an embodiment, the third material composition 438 may be provided at a midpoint between the first material composition 431 and the second material composition 438. In other embodiments, a distance between the third material composition 438 and the first material composition 431 may be different than a distance between the third material composition 438 and the second material composition 432. For example, the third material composition 431 may be closer to the first material composition 431 than the second material composition 432, or vice versa.

Figure 4B:
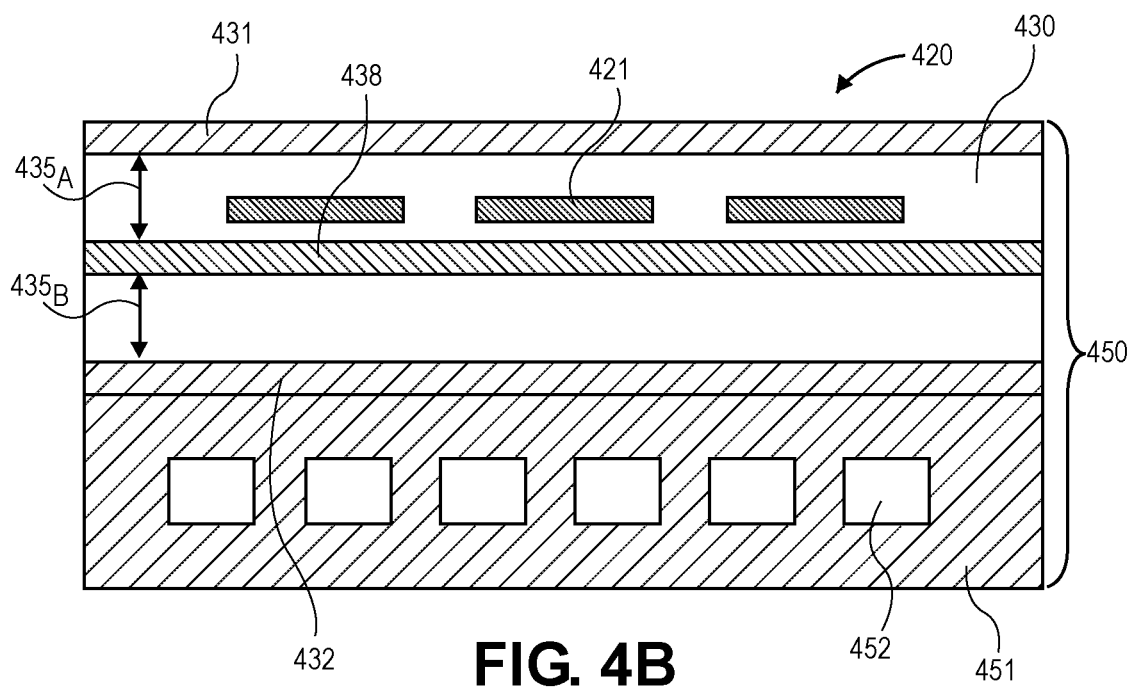
FIG. 4B is a cross-sectional illustration of an electrostatic chuck with a puck that includes three material compositions with compositional gradients therebetween, in accordance with an embodiment.

Referring now to FIG. 4B, a cross-sectional illustration of a chuck 450 is shown, in accordance with an embodiment. In an embodiment, the chuck 450 comprises a puck 420 that is provided over a base plate 451. The chuck 450 may comprise a substrate 430 with a first material composition 431, a second material composition 432, and a third material composition 438. Compositional gradients 435A and 435B may be provided between the different material compositions. In an embodiment, the base plate 451 may comprise cooling channels 452.

In an embodiment, the puck 430 is diffusion bonded to the base plate 451. For example, the second material composition 432 and the base plate 451 may comprise the same material. By including the same material at the interface, lower stresses (due to coefficient of thermal expansion (CTE) mismatch) are provided. While shown with a diffusion bonded interface, it is to be appreciated that embodiments may also include an adhesive bond between the second material composition 432 and the base plate 451.

Figure 4C:
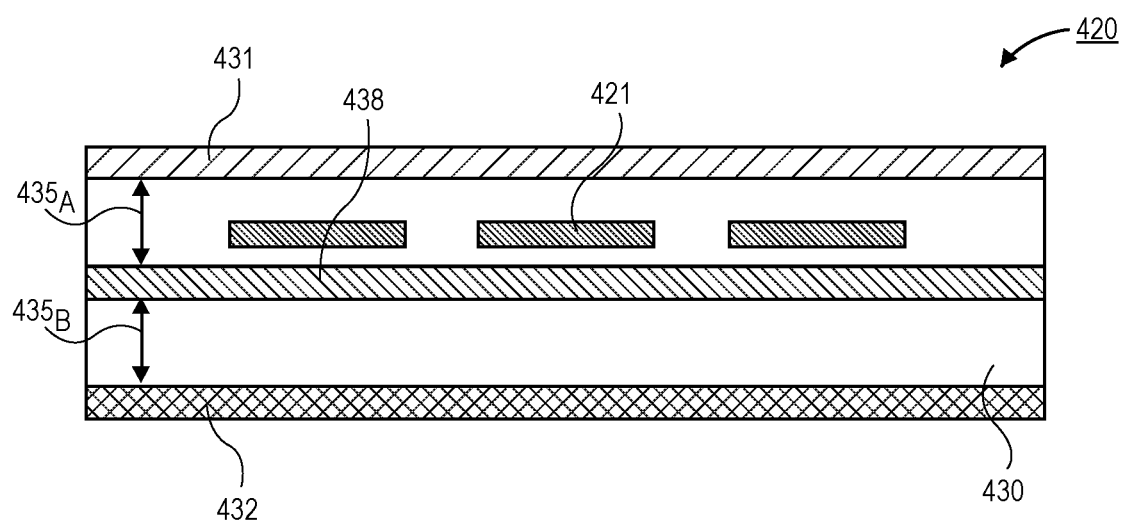
FIG. 4C is a cross-sectional illustration of a puck with a first material composition, a second material composition, and a third material composition with compositional gradients between the layers, in accordance with an embodiment.

Referring now to FIG. 4C, a cross-sectional illustration of a puck 420 is shown, in accordance with an additional embodiment. As shown in FIG. 4C, the substrate 420 includes three material compositions 431, 432, and 438. However, in contrast to the embodiment described in FIGS. 4A and 4B, the three material compositions 431, 432, and 438 are different material compositions. For example, the first material composition 431 may comprise $Al_2O_3$, the second material composition 432 may comprise a metal, and the third material composition 438 may comprise AlN. Compositional gradients 435A and 435B may be provided through a thickness of the substrate 420 between the material compositions 431, 432, and 438.

Figure 4D:
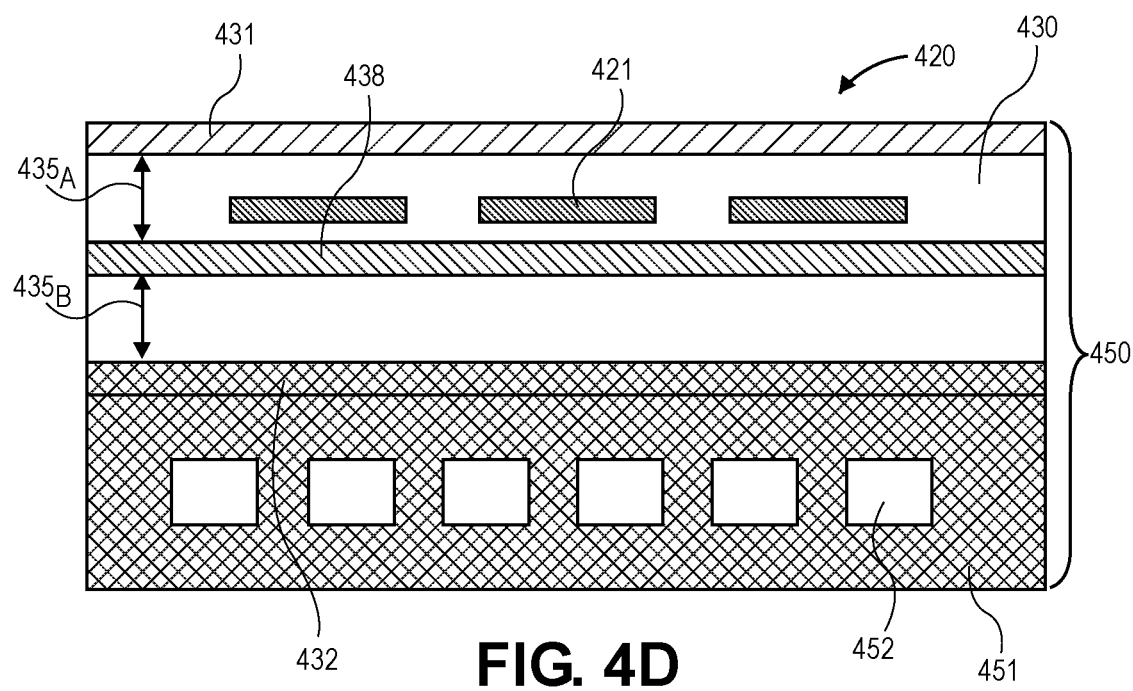
FIG. 4D is a cross-sectional illustration of an electrostatic chuck with a puck that includes three material compositions with compositional gradients therebetween, in accordance with an embodiment.

Referring now to FIG. 4D, a cross-sectional illustration of a chuck 450 is shown, in accordance with an embodiment. In an embodiment, the chuck 450 comprises a puck 420 that is provided over a base plate 451. The chuck 450 may comprise a substrate 430 with a first material composition 431, a second material composition 432, and a third material composition 438. Compositional gradients 435A and 435B may be provided between the different material compositions. In an embodiment, the base plate 451 may comprise cooling channels 452.

In an embodiment, the puck 430 is diffusion bonded to the base plate 451. For example, the second material composition 432 and the base plate 451 may comprise the same material. By including the same material at the interface, lower stresses (due to CTE mismatch) are provided. While shown with a diffusion bonded interface, it is to be appreciated that embodiments may also include an adhesive bond between the second material composition 432 and the base plate 451.

Figure 5:
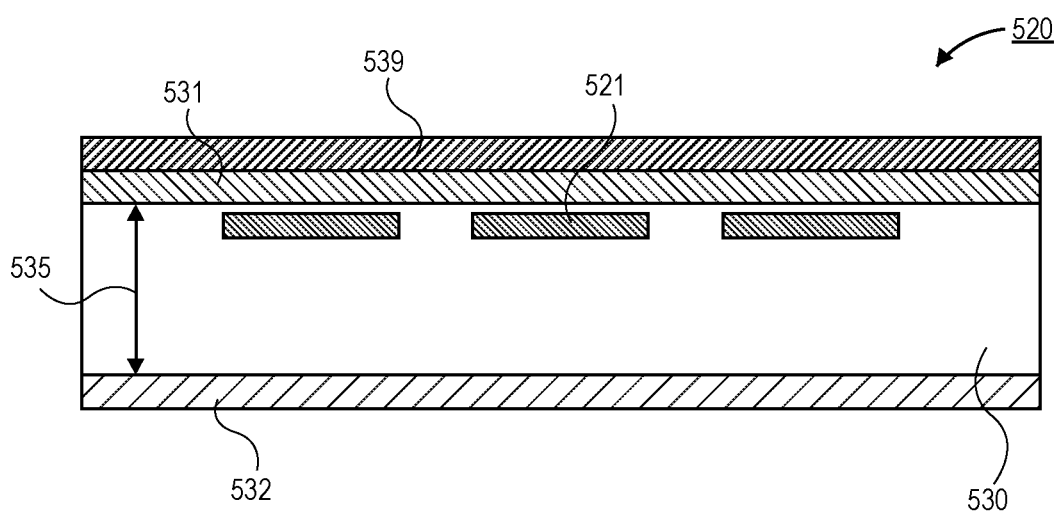
FIG. 5 is a cross-sectional illustration of a puck with a first material composition, a second material composition directly below the first material composition, and a third material composition at a bottom of the puck, in accordance with an embodiment.

Referring now to FIG. 5, a cross-sectional illustration of a puck 520 is shown, in accordance with an additional embodiment. In an embodiment, the puck 520 comprises a substrate 530, electrodes 521, and a plurality of material composition layers. For example, the puck 520 may include a first material composition 531, a second material composition 532, and a third material composition 539. In an embodiment, the third material composition 539 may be provided at a top surface of the substrate 530. The third material composition 539 may comprise a material that is resistant to etching chemistries (e.g., halogen etching chemistries). For example, the third material composition 539 may comprise $Y_2O_3$. In the illustrated embodiment, the third material composition 539 is directly over the first material composition 531. However, it is to be appreciated that a compositional gradient may be provided between the first material composition 531 and the third material composition 539. In an embodiment, a compositional gradient 535 may also be provided between the first material composition 531 and the second material composition 532.

Figure 6:
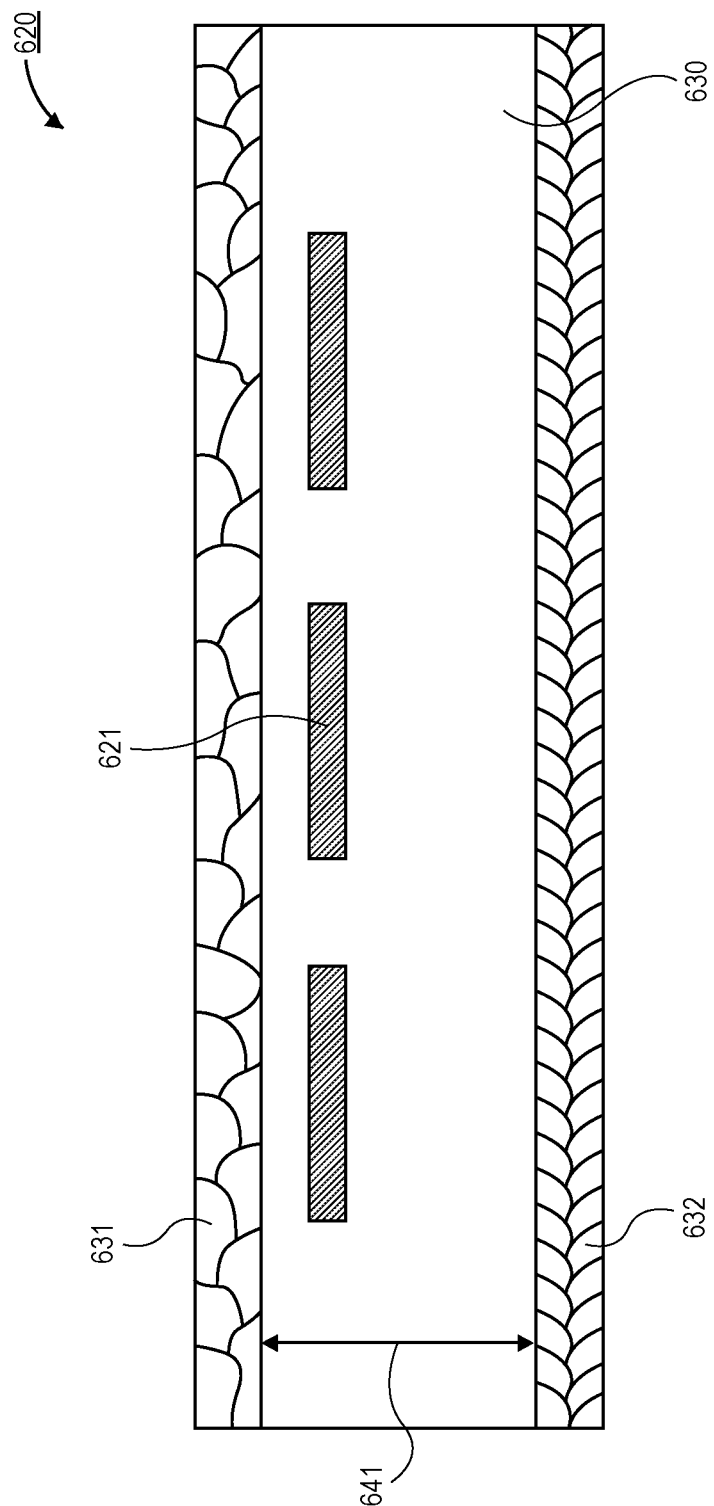
FIG. 6 is a cross-sectional illustration of a puck with a first material composition with a first grain size and a second material composition with a second grain size, and a grain size gradient between the first material composition and the second material composition, in accordance with an embodiment.

Referring now to FIG. 6, a cross-sectional illustration of a puck 620 is shown, in accordance with an additional embodiment. In an embodiment, the puck 620 may comprise a substrate 630 with embedded electrodes 621. In an embodiment, a first material composition 631 may be at a top of the substrate 630 and a second material composition 632 may be at a bottom of the substrate 630. As shown, the material compositions 631 and 632 differ from each other in terms of average grain size. That is, the elemental material of the material compositions 631 and 632 may be the same, but the grain size is different. For example, the first material composition 631 may comprise AlN with a first grain size, and the second material composition 632 may comprise AlN with a second grain size. As shown, the second grain size is smaller than the first grain size. In an embodiment, a grain size gradient 641 may be provided through the thickness of the substrate 630 in order to transition from the first grain size to the second grain size. In other embodiments, the first material composition 631 and the second material composition 632 may have different elemental compositions and different average grain sizes. For example, the first material composition 631 may comprise $Al_2O_3$ with a first grain size, and the second material composition 631 may comprise AlN with a second (smaller) grain size.

Figure 7A:
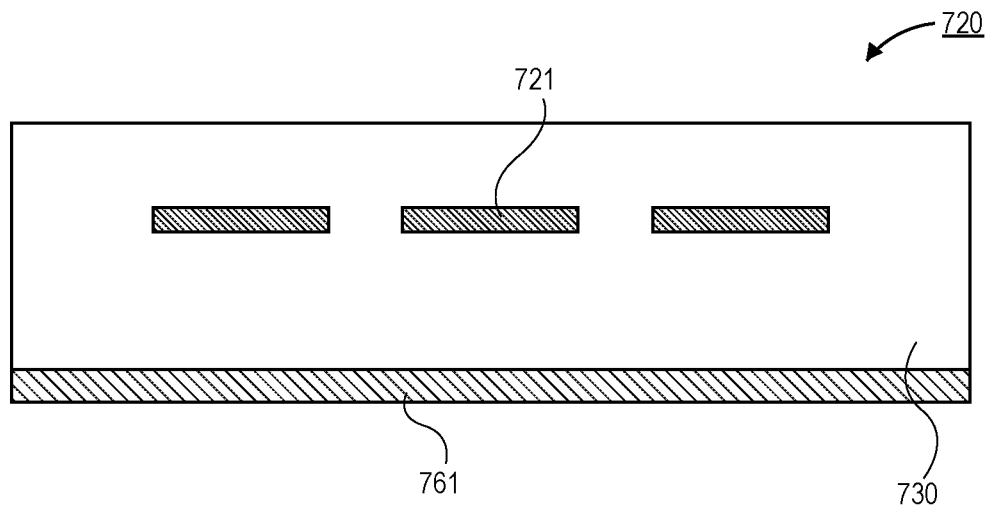
FIG. 7A is a cross-sectional illustration of a puck with a diffusion source on a surface of the puck, in accordance with an embodiment.
Figure 7B:
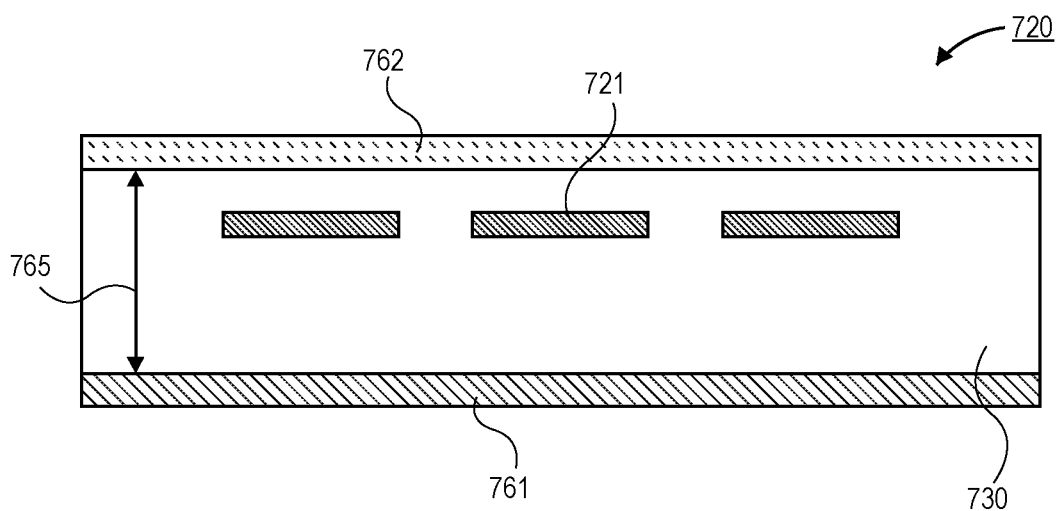
FIG. 7B is a cross-sectional illustration of the puck in FIG. 7A after a diffusion process is implemented, in accordance with an embodiment.

Referring now to FIGS. 7A and 7B, a pair of cross-sectional illustrations depicting a process for forming a compositional gradient is shown, in accordance with an embodiment. In FIG. 7A, a puck 720 with a substrate 730 and embedded electrodes 721 is shown. In an embodiment, a first material composition 761 may be provided at a bottom surface of the substrate 730. For example, the first material composition 761 may comprise $Al_2O_3$ or AlN.

Referring now to FIG. 7B, a cross-sectional illustration of the puck 720 after a diffusion process is shown, in accordance with an embodiment. For example, the puck 720 may be exposed to high temperatures in order to drive diffusion of the solid solution of the first material composition 761 through the substrate 730. As shown, a second material composition 762 may be provided on the top surface of the substrate 730. The second material composition may contain a lower percentage of the solid solution from the first material composition 761. The diffusion process may also produce a compositional gradient 765 through a thickness of the substrate 730.

In an embodiment, the first material composition 761 may be either in a green state, partially sintered, or sintered. In some embodiments, the first material composition 761 may be a sacrificial layer. That is, the residual portion of the first material composition may be removed (e.g., with a grinding or polishing process) after the diffusion process.

Figure 8A:
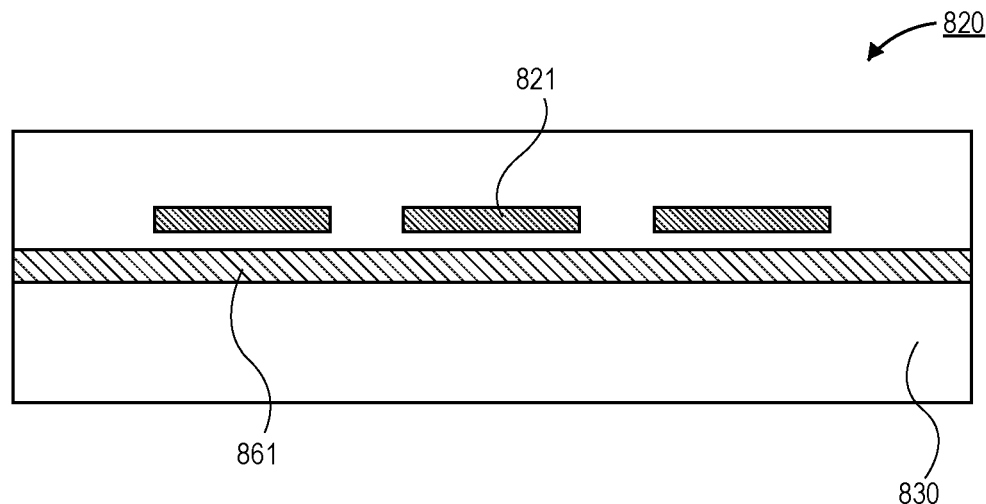
FIG. 8A is a cross-sectional illustration of a puck with a diffusion source embedded in the puck, in accordance with an embodiment.
Figure 8B:
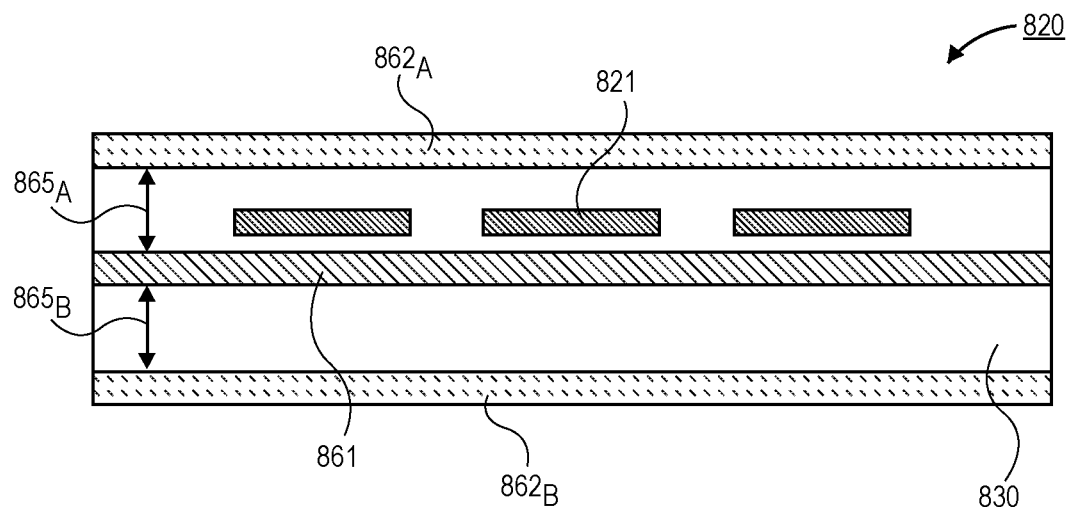
FIG. 8B is a cross-sectional illustration of the puck in FIG. 8A after a diffusion process is implemented, in accordance with an embodiment.

Referring now to FIGS. 8A and 8B, a pair of cross-sectional illustrations depicting a process for forming a compositional gradient is shown, in accordance with an embodiment. In FIG. 8A, a puck 820 with a substrate 830 and embedded electrodes 821 is shown. In an embodiment, a first material composition 861 may be provided in the middle of the substrate 830. For example, the first material composition 861 may comprise $Al_2O_3$ or AlN.

Referring now to FIG. 8B, a cross-sectional illustration of the puck 820 after a diffusion process is shown, in accordance with an embodiment. For example, the puck 820 may be exposed to high temperatures in order to drive diffusion of the solid solution of the first material composition 861 through the substrate 830. As shown, a second material composition 862A may be provided on the top surface of the substrate 830 and a third material composition 862B may be provided at a bottom surface of the substrate 830. The second material composition 862A and the third material composition 862B may contain a lower percentage of the solid solution from the first material composition 861. The diffusion process may also produce compositional gradients 865A and 865B through a thickness of the substrate 830.

In FIGS. 7A-8B, the diffusion process includes a physical layer that is the source of the material that is diffused through the substrate. However, it is to be appreciated that a gradient may be generated by other methods as well. For example, during the sintering process, the sintering environment (e.g., a gas composition) may be changed (e.g., increased or decreased gas concentration) in order to vary the amount of the gas constituent that is incorporated into the substrate.

Figure 9:
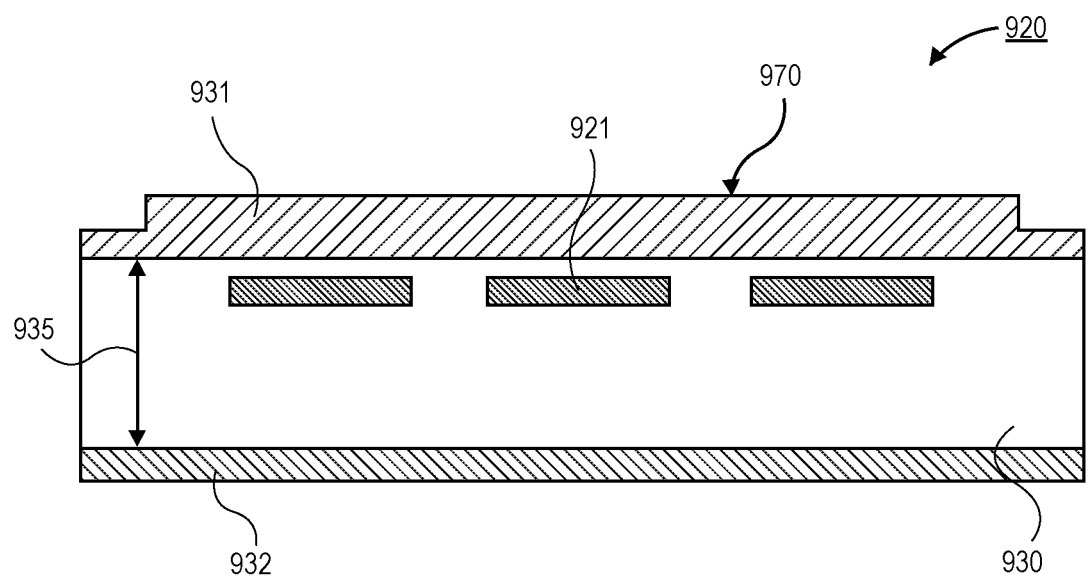
FIG. 9 is a cross-sectional illustration of a puck with a mesa and a first material composition and a second material composition, in accordance with an embodiment.

Referring now to FIG. 9, a cross-sectional illustration of a puck 920 is shown, in accordance with an additional embodiment. In an embodiment, the puck 920 comprises a substrate 930 and embedded electrodes 921. A first material composition 931 may be provided at a top surface of the substrate 930 and a second material composition 932 may be provided at a bottom surface of the substrate 930. In an embodiment, a compositional gradient 935 between the first material composition 931 and the second material composition 932 may be provided through the thickness of the substrate 930. In an embodiment, a mesa 970 may be fabricated into the top surface of the substrate 930. While the previous embodiments are shown without a mesa 970, it is to be appreciated that any of the embodiments disclosed herein may also include a mesa similar to mesa 970 in FIG. 9.

It is to be appreciated that the compositional gradients described herein can take the form of various material property variations. For example, compositional gradients described herein may refer to changes to one or more of material type, particle size, crystallite size, porosity, and material attribute (e.g., CTE, Young's modulus, Poisson ratio, thermal conductivity, hardness, resistivity, etc.).

Additionally, it is to be appreciated that embodiments described herein can be fabricated using various processes. For example, green sheet lamination, hot press, cold isostatic press, field assisted sintering, electrophoretic deposition, laser sintering, 3D printing, solgel, gel cast, or combinations thereof may be used to form pucks with a compositional gradient. In some embodiments, the entire ceramic body can be co-sintered or sintered in multiple steps. The sintering temperatures may range from between 20° C. and 2,000° C. In some embodiments, the grading can be accomplished during the sintering process by changing the ambient gas composition (e.g., changing $O_2$ gas, changing partial pressures, changing species of the gas, or the like). Raw material powder sizes can vary from approximately 1 nm to up to approximately 500 μm. In an embodiment, the ceramic material may be piezoelectric (e.g., AlN, PZT, $BaTiO_3$ based, $SrTiO_3$ templates, or the like). In other embodiments, the ceramic material may be piezoresistive. The thickness of the substrate for the pucks may range from between approximately 0.1 mm and approximately 20 mm.

Figure 10:
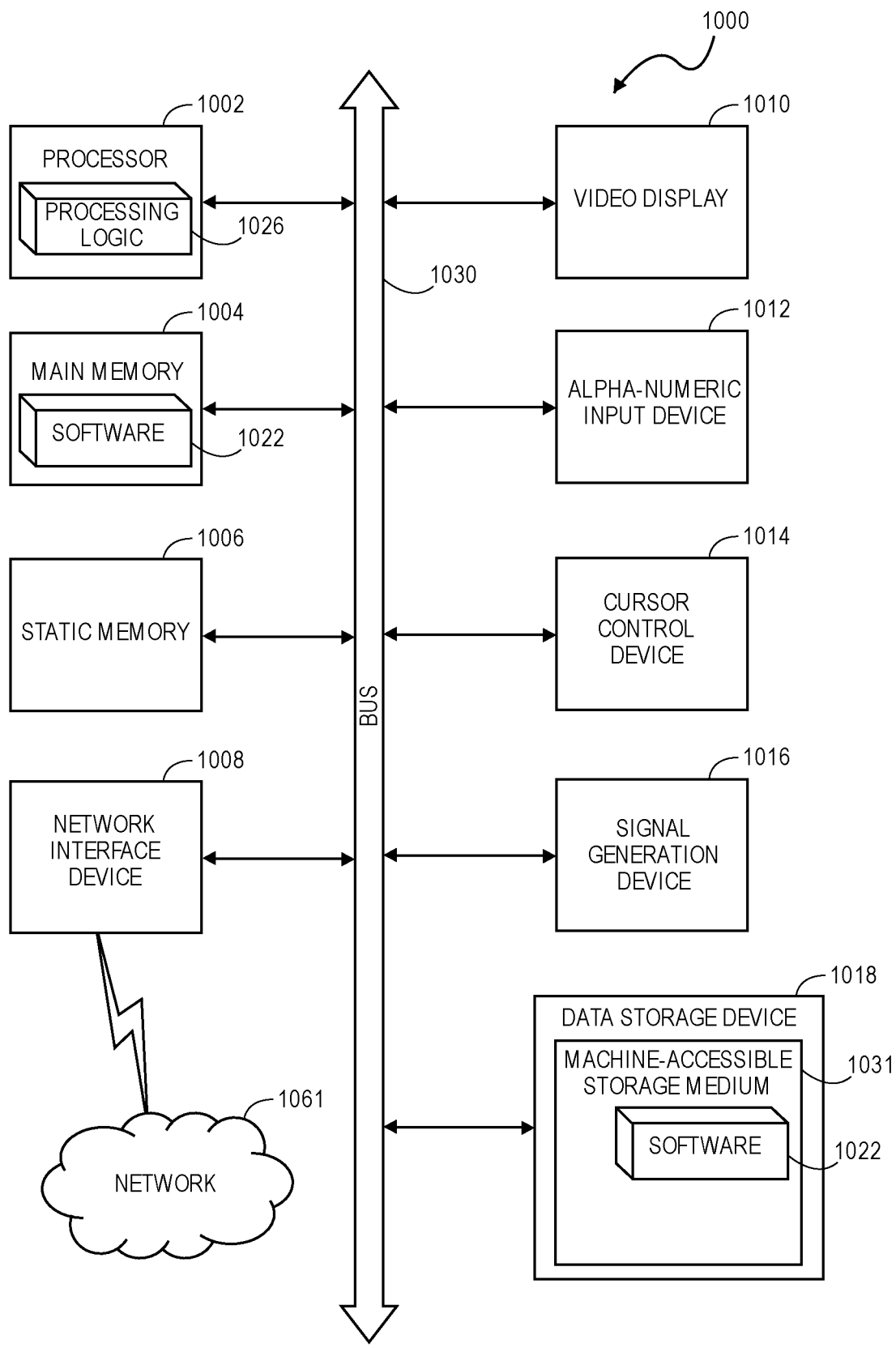
FIG. 10 illustrates a block diagram of an exemplary computer system that may be used in conjunction with a processing tool, in accordance with an embodiment.

Referring now to FIG. 10, a block diagram of an exemplary computer system 1000 of a processing tool is illustrated in accordance with an embodiment. In an embodiment, computer system 1000 is coupled to and controls processing in the processing tool. Computer system 1000 may be connected (e.g., networked) to other machines in a Local Area Network (LAN), an intranet, an extranet, or the Internet. Computer system 1000 may operate in the capacity of a server or a client machine in a client-server network environment, or as a peer machine in a peer-to-peer (or distributed) network environment. Computer system 1000 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 1000, the term "machine" shall also be taken to include any collection of machines (e.g., computers) that individually or jointly execute a set (or multiple sets) of instructions to perform any one or more of the methodologies described herein.

Computer system 1000 may include a computer program product, or software 1022, having a non-transitory machine-readable medium having stored thereon instructions, which may be used to program computer system 1000 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 1000 includes a system processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

System processor 1002 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 1002 may also be one or more special-purpose processing devices such as an application specific integrated circuit (ASIC), a field programmable gate array (FPGA), a digital signal system processor (DSP), network system processor, or the like. System processor 1002 is configured to execute the processing logic 1026 for performing the operations described herein.

The computer system 1000 may further include a system network interface device 1008 for communicating with other devices or machines. The computer system 1000 may also include a video display unit 1010 (e.g., a liquid crystal display (LCD), a light emitting diode display (LED), or a cathode ray tube (CRT)), an alphanumeric input device 1012

(e.g., a keyboard), a cursor control device 1014 (e.g., a mouse), and a signal generation device 1016 (e.g., a speaker).

The secondary memory 1018 may include a machine-accessible storage medium 1032 (or more specifically a computer-readable storage medium) on which is stored one or more sets of instructions (e.g., software 1022) embodying any one or more of the methodologies or functions described herein. The software 1022 may also reside, completely or at least partially, within the main memory 1004 and/or within the system processor 1002 during execution thereof by the computer system 1000, the main memory 1004 and the system processor 1002 also constituting machine-readable storage media. The software 1022 may further be transmitted or received over a network 1020 via the system network interface device 1008. In an embodiment, the network interface device 1008 may operate using RF coupling, optical coupling, acoustic coupling, or inductive coupling.

While the machine-accessible storage medium 1032 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A puck for an electrostatic chuck, comprising:
   a substrate with a top surface and a bottom surface;
   a first material composition at the top surface of the substrate;
   a second material composition at the bottom surface of the substrate;
   a composition gradient through the substrate between the top surface and the bottom surface; and
   a third material composition between the first material composition and the second material composition, wherein the composition gradient comprises a first grading between the first material composition and the third material composition and a second grading between the third material composition and the second material composition.

2. The puck of claim 1, wherein the first material composition comprises up to and including 100% of a first solid solution phase, and wherein the second material composition comprises up to and including 100% of a second solid solution phase.

3. The puck of claim 2, wherein the first solid solution phase comprises $Al_2O_3$, and wherein the second solid solution phase comprises AlN.

4. The puck of claim 2, wherein the first solid solution phase comprises AlN, and wherein the second solid solution phase comprises $Al_2O_3$.

5. The puck of claim 1, wherein the first material composition comprises a first solid solution phase and a second solid solution phase, and wherein the second material composition comprises the first solid solution phase and the second solid solution phase, wherein a percentage of the second solid solution phase in the second material composition is less than a percentage of the second solid solution phase in the first material composition.

6. The puck of claim 1, wherein first material composition and the second material composition comprise one or more of a metal oxide, a nitride, a carbide, a boride, a fluoride, a silicide, and a sulfide.

7. The puck of claim 6, wherein a metal oxide comprises one or more of aluminum, copper, molybdenum, tungsten, and graphite.

8. The puck of claim 7, wherein the metal comprises 0.01% or more of the material composition.

9. The puck of claim 1, wherein the first material composition is substantially similar to the second material composition.

10. The puck of claim 1, wherein the first material composition, the second material composition, and the third material composition are different from each other.

11. The puck of claim 1, wherein the first material composition comprises yttrium and oxygen, wherein the second material composition comprises aluminum and nitrogen, and wherein the third material composition comprises aluminum and oxygen.

12. The puck of claim 1, wherein the first material composition has a first average grain size, and wherein the second material composition has a second average grain size that is different than the first average grain size.

13. A puck for an electrostatic chuck, comprising:
    a substrate;
    a first material composition in the substrate;
    a second material composition in the substrate; and
    a composition gradient between the first material composition and the second material composition, wherein the composition gradient extends out radially from a center of the substrate to an edge of the substrate.

14. The puck of claim 13, wherein the composition gradient is an asymmetric composition gradient.

15. An electrostatic chuck, comprising:
    a base plate; and
    a puck adhered to the base plate, wherein the puck comprises:
    a substrate;
    a first material composition in the substrate;
    a second material composition in the substrate;
    a composition gradient between the first material composition and the second material composition; and
    a third material composition between the first material composition and the second material composition, wherein the composition gradient comprises a first grading between the first material composition and the third material composition and a second grading between the third material composition and the second material composition.

16. The electrostatic chuck of claim 15, further comprises an electrode embedded in the substrate.

17. The electrostatic chuck of claim 15, wherein a mesa is fabricated into a top surface of the substrate.

18. A puck for an electrostatic chuck, comprising:
    a substrate with a top surface and a bottom surface;
    a first material composition at the top surface of the substrate;
    a second material composition at the bottom surface of the substrate; and a composition gradient through the substrate between the top surface and the bottom surface, wherein the first material composition has a first average grain size, and wherein the second material composition has a second average grain size that is different than the first average grain size.

\* \* \* \* \*